US011176537B2

(12) United States Patent
Wang et al.

(10) Patent No.: US 11,176,537 B2
(45) Date of Patent: Nov. 16, 2021

(54) PAYMENT INFORMATION PROCESSING METHOD, APPARATUS, AND USER DEVICE

(71) Applicant: Advanced New Technologies Co., Ltd., Grand Cayman (KY)

(72) Inventors: Jun Wang, Hangzhou (CN); Jiajia Li, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 372 days.

(21) Appl. No.: 15/615,770

(22) Filed: Jun. 6, 2017

(65) Prior Publication Data

US 2017/0364904 A1    Dec. 21, 2017

(30) Foreign Application Priority Data

Jun. 21, 2016   (CN) .......................... 201610453460.9

(51) Int. Cl.
*G06Q 20/32*    (2012.01)
*G06Q 20/10*    (2012.01)
*G06Q 20/08*    (2012.01)
*G06Q 20/40*    (2012.01)

(52) U.S. Cl.
CPC ....... *G06Q 20/3276* (2013.01); *G06Q 20/085* (2013.01); *G06Q 20/10* (2013.01); *G06Q 20/105* (2013.01); *G06Q 20/322* (2013.01); *G06Q 20/40* (2013.01)

(58) Field of Classification Search
CPC ........................... G06Q 20/085; G06Q 20/105
USPC ........................................................... 705/39
See application file for complete search history.

(56) References Cited

U.S. PATENT DOCUMENTS

| 8,682,802 | B1 | 3/2014 | Kannanari |
| 2009/0328207 | A1 | 12/2009 | Patel |
| 2011/0035319 | A1 | 2/2011 | Brand et al. |
| 2012/0290449 | A1* | 11/2012 | Mullen .................. G06Q 10/00 705/27.2 |
| 2012/0310760 | A1 | 12/2012 | Phillips et al. |
| 2014/0344147 | A1 | 11/2014 | Smith et al. |
| 2015/0205456 | A1 | 7/2015 | Ji et al. |

(Continued)

FOREIGN PATENT DOCUMENTS

| CN | 102932540 A | 2/2013 |
| CN | 103984464 A | 8/2014 |

(Continued)

OTHER PUBLICATIONS

PCT Search Report and Written Opinion dated Aug. 14, 2017 for PCT application No. PCT/US2017/036226, 10 pages.

(Continued)

Primary Examiner — Jessica Lemieux
(74) Attorney, Agent, or Firm — Lee & Hayes, P.C.

(57) ABSTRACT

A payment information processing method is disclosed. The method includes detecting a preset operation for a user interface; displaying a new window on the user interface, the new window including one or more payment application identifiers; selecting a payment application identifier in the new window; and displaying payment information corresponding to the selected payment application identifier on the user interface, thus implementing a convenient means of making a payment without interrupting a current operation of the user, and greatly improving the user experience.

16 Claims, 8 Drawing Sheets

(56) References Cited

U.S. PATENT DOCUMENTS

2015/0339052 A1    11/2015  Yuan et al.
2016/0260090 A1*  9/2016  Healy .................... G06Q 20/32

FOREIGN PATENT DOCUMENTS

| CN | 105046482 A | | 11/2015 | |
|---|---|---|---|---|
| CN | 105279646 | * | 1/2016 | ............ G06Q 20/32 |
| CN | 105653275 A | | 6/2016 | |
| CN | 105654288 A | * | 6/2016 | |
| CN | 105654288 A | | 6/2016 | |
| EP | 1898349 A1 | | 3/2008 | |
| JP | 2019526088 A | | 9/2019 | |
| KR | 20130138659 A | | 12/2013 | |
| WO | WO2014176560 | | 10/2014 | |
| WO | WO2015180496 | | 12/2015 | |
| WO | WO2015184353 | | 12/2015 | |
| WO | WO-2015184353 A1 | * | 12/2015 | ........... G06Q 20/405 |

OTHER PUBLICATIONS

Chinese Search Report for Chinese application No. 201610453460. 9, dated Jul. 5, 2019, 2 pages.
Translation of Chinese Office Action dated Mar. 10, 2020, from corresponding CN Patent Application No. 201610453460.9, 8 pages.
Indonesian Office Action dated Feb. 13, 2020, for Indonesian Patent Application No. PID201809346, a counterpart foreign application of the U.S. Appl. No. 15/615,770, 4 pages.
Translation of Chinese Office Action dated Dec. 11, 2019, from corresponding CN Patent Application No. 201610453460.9, 8 pages.
Translation of Chinese Office Action dated Jul. 16, 2019, from corresponding CN Patent Application No. 201610453460.9, 6 pages.
Translation of Chinese Supplemental Search Report dated Dec. 3, 2019, from corresponding corresponding CN Patent Application No. 201610453460.9, 2 pages.
Extended European Search Report dated Dec. 16, 2019 for European Patent Application No. 17815921.6, 8 pages.
Japanese Office Action dated Jan. 28, 2020 for Japanese Patent Application No. 2018-559755, a counterpart of U.S. Appl. No. 15/615,770, 6 pages.
Indian Office Action dated Dec. 4, 2020 for Indian U.S. Appl. No. 15/615,770, a counterpart foreign application of U.S. Appl. No. 15/615,770, 7 pages.
Japanese Decision to Grant dated Aug. 18, 2020 for Japanese Patent Application No. 2018-559755, a counterpart of U.S. Appl. No. 15/615,770, 2 pages.
Japanese Office Action dated Mar. 27, 2020 for Japanese Patent Application No. 2018-559755, a counterpart of U.S. Appl. No. 15/615,770, 3 pages.
Korean Office Action dated Oct. 30, 2020 for Korean Patent Application No. 2018-7036913, a counterpart of U.S. Appl. No. 15/615,770, 6 pages.
Translation of Chinese Office Action dated Mar. 10, 2020, from corresponding CN Patent Application No. 201610453460.9, 13 pages.
Translation of Chinese Supplemental Search Report dated Apr. 24, 2020, from corresponding corresponding CN Patent Application No. 201610453460.9, 1 page.
Japanese Office Action dated Apr. 14, 2020 for Japanese Patent Application No. 2018-559755, a counterpart of U.S. Appl. No. 15/615,770, 4 pages.
Translated Korean Office Action dated Apr. 16, 2020 for Korean Patent Application No. 2018-7036913, a counterpart of U.S. Appl. No. 15/615,770, 3 pages.
Singapore Written Opinion dated May 2, 2020 for Singapore Application No. 11201811042P, 5 pages.
Japanese Office Action dated May 3, 2021 for Japanese Patent Application No. 17815921.6, a counterpart foreign application of the U.S. Appl. No. 15/615,770, 8 pages.
Indonesia Office Action dated Apr. 6, 2021 for Indonesian Patent Application No. PID201809346, a foreign counterpart of U.S. Appl. No. 15/615,770, 4 pages.

* cited by examiner

PAYMENT INFORMATION PROCESSING METHOD, APPARATUS, AND USER DEVICE

CROSS REFERENCE TO RELATED PATENT APPLICATION

This application claims foreign priority to Chinese Patent Application No. 201610453460.9 filed on Jun. 21, 2016, entitled "Payment Information Processing Method, Apparatus, and User Device", which is hereby incorporated by reference in its entirety.

TECHNICAL FIELD

The present disclosure relates to the field of Internet payment technologies, and in particular, to payment information processing methods, apparatuses, and user devices.

BACKGROUND

At present, a consumer may swipe a card on a POS (point of sales) terminal for settlement through a payment account (for example, a prepaid card issued by a merchant, an all-purpose card, and the like) when making a payment for a transaction. Although this type of traditional payment method of "swiping card" may allow the consumer to avoid carrying a large amount of cash, the consumer still has to carry a payment account to make a payment by swiping the card. This imposes a limitation on making the payment for a transaction.

With the popularization of mobile communication technologies, people generally carry mobile terminals with them. A multimedia function has already become a standard configuration in a mobile terminal. For example, many mobile terminals have a transaction payment function. However, existing payment functions of mobile terminals require users to find corresponding applications having a payment function. If a user is currently using another application, the user has to close this other application that is currently in use, find a corresponding application having a payment function on the desktop of a user device, open a payment page of the application having the payment function, find a corresponding payment entry (such as a QR code or a sound wave, etc.), and send it to a merchant terminal to complete a payment. Therefore, the entire payment process not only consumes a lot of time of the user or the merchant, but also interrupts the user from using the other application, thus making the payment inconvenient.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Accordingly, the present disclosure provides a method, an apparatus, and a user device for processing payment information, which can complete a payment conveniently without interrupting a current operation of a user, thus greatly improving the user experience.

To solve the above technical problem, the present disclosure provides a payment information processing method, which includes detecting a preset operation for a user interface; displaying a new window on the user interface, the new window including one or more payment application identifiers; selecting a payment application identifier in the new window; and displaying payment information corresponding to the selected payment application identifier on the user interface.

In implementations, the method may further include setting a trigger position region of the new window on the user interface; detecting an action of operation performed on the trigger position region according to a preset action of operation; and displaying the new window at a preset position of the user interface.

In implementations, the preset action of operation may include a sliding operation, a double-click operation, or a click operation.

In implementations, the method may further include detecting whether the user interface is unlocked; and displaying first payment information corresponding to the selected payment application identifier on the user interface if affirmative, or displaying second payment information corresponding to the selected payment application identifier on the user interface otherwise, wherein the first payment information is valid payment information, and the second payment information is invalid payment information.

In implementations, the method may further include acquiring the first payment information from the selected payment application, and displaying the first payment information on the user interface in response to determining that the selected payment application identifier exists in a pre-authorized application identifier list based on the selected payment application identifier, upon detecting that the user interface is in the unlocked state.

In implementations, the method may further include inserting an identifier of the new window in the payment application corresponding to the payment application identifier.

In implementations, the method may further include detecting whether the identifier of the new window is inserted in the payment application corresponding to the payment application identifier after detecting a preset operation for the trigger position region of the new window set on the user interface, and adding the payment application identifier to the new window if affirmative.

In implementations, the present disclosure further provides a payment information processing apparatus, which include a detection module configured to detect a preset operation for a user interface; a first display module configured to display a new window on the user interface, the new window including one or more payment application identifiers; a selection module configured to select a payment application identifier in the new window; and a second display module configured to display payment information corresponding to the selected payment application identifier on the user interface.

In implementations, the apparatus may further include a setting module configured to set a trigger position region of the new window on the user interface.

In implementations, the detection module may further detect an action of operation performed on the trigger position region according to a preset action of operation, and the first display module may display the new window at a preset position of the user interface.

In implementations, the preset action of operation may include a sliding operation, a double-click operation, or a click operation.

In implementations, the detection module may further detect whether the user interface is unlocked, and the second display module may further first display payment information corresponding to the selected payment application identifier on the user interface in response to detecting that the user interface is in an unlocked state; or display second payment information corresponding to the selected payment application identifier on the user interface in response to detecting that the user interface is in a locked state, wherein the first payment information is valid payment information, and the second payment information is invalid payment information.

In implementations, the apparatus may further include a determination module configured to determine whether the selected payment application identifier exists in a pre-authorized application identifier list based on the selected payment application identifier, upon detecting that the user interface is in the unlocked state; and an acquisition module configured to acquire the first payment information from the selected payment application in response to determining that the selected payment application identifier exists in the pre-authorized application identifier list. In implementation, the second display module may display the acquired first payment information on the user interface.

In implementations, the apparatus may further include an insertion module configured to insert an identifier of the new window in the payment application corresponding to the payment application identifier.

In implementations, the detection module may further detect whether the identifier of the new window is inserted in the payment application corresponding to the payment application identifier in response to detecting a preset operation for the trigger position region of the new window set on the user interface.

In implementations, the apparatus may further include an addition module configured to add the payment application identifier to the new window in response to detecting that the identifier of the new window is inserted in the payment application corresponding to the payment application identifier.

In implementations, the present disclosure further provides a user device, which may include the foregoing payment information processing apparatus.

The disclosed method and apparatus detect a preset operation for a user interface; display a new window on the user interface, the new window including one or more payment application identifiers; select a payment application identifier in the new window; and display payment information corresponding to the selected payment application identifier on the user interface. Accordingly, a user does not need to find and open payment information of a corresponding application having a payment function. Even if the user is using another application, the user does not need to close the other application that is currently used. Instead, the user can directly find the payment information of the corresponding application having the payment function from the displayed new window by performing the preset operation on the desktop of a user device, thus completing the payment. Therefore, the entire payment process can greatly save time for the user or merchant. Moreover, the payment may be completed conveniently without interrupting the current operation of the user, thus greatly improving the user experience.

Apparently, products implementing the present disclosure may not need to achieve all the above technical effects at the same time.

BRIEF DESCRIPTION OF THE DRAWINGS

Accompanying drawings described herein are used to provide further understanding of the present disclosure, and form a part of the present disclosure. Exemplary embodiments of the present disclosure and description thereof are used to explain the present disclosure, and are not intended to impose limitations on the present disclosure.

DETAILED DESCRIPTION

Implementations of the present disclosure are described in detail hereinafter with reference to the accompanying drawings and exemplary embodiments, to enable a full understanding of how the present disclosure implements the solutions of the technical problems by applying the technical measures and achieves the technical effects.

First Embodiment

Figure 1:
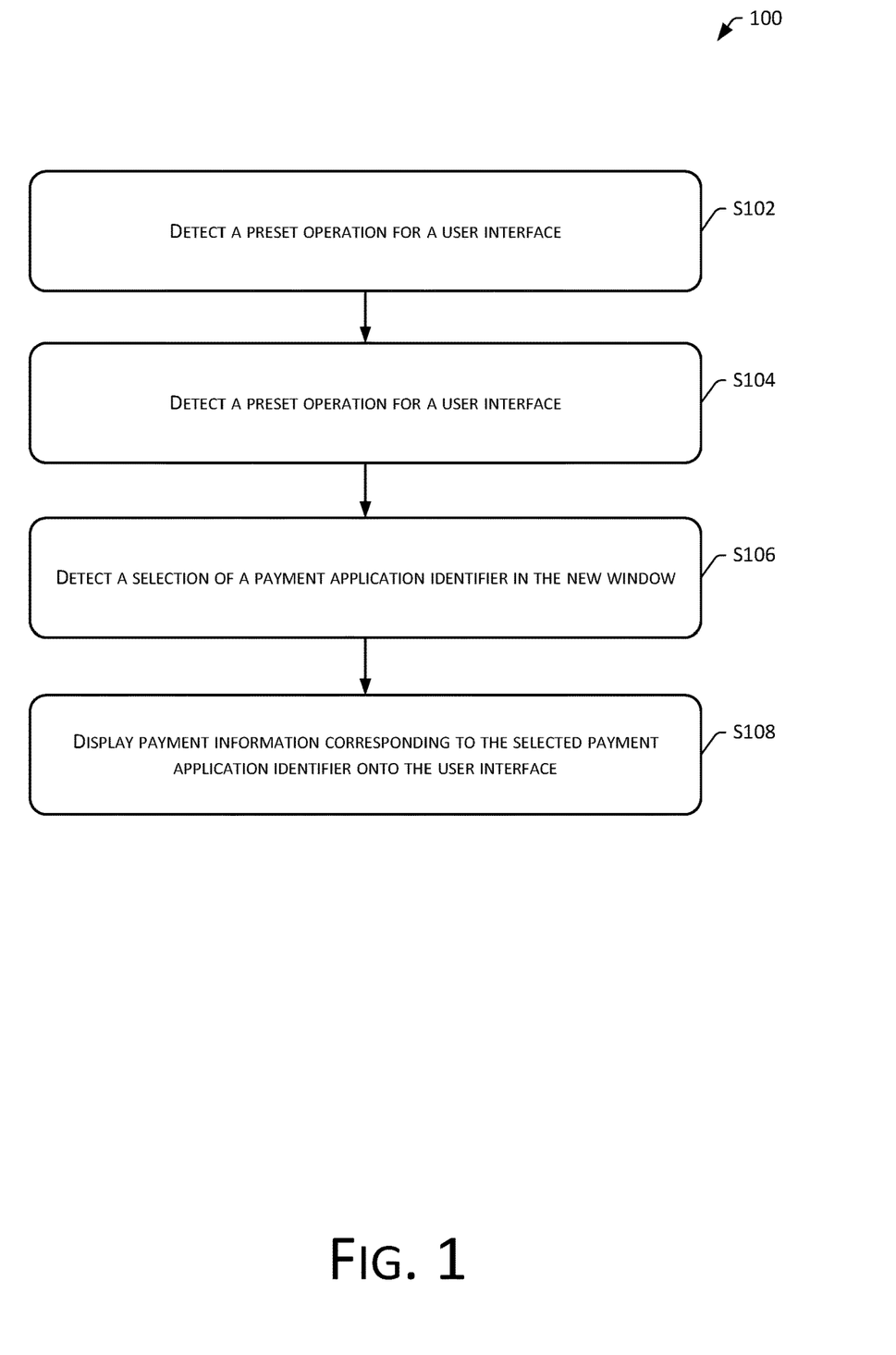
FIG. 1 is a flowchart of a payment information processing method according to an embodiment of the present disclosure.

FIG. 1 is a flowchart of a payment information processing method 100 according to an embodiment of the present disclosure. As shown in FIG. 1, the method 100 may include the following procedure.

S102 detects a preset operation for a user interface.

In implementations, a trigger position region of a new window may be set on a user interface (e.g., a user desktop), so that a user may perform an action of operation on the trigger position region according to a preset action of operation. In implementations, the preset action of operation may include, but is not limited to, a sliding operation, a double-click operation, or a click operation, for example.

S104 displays a new window on the user interface.

For example, a preset position for displaying a new window may be set on the user interface. When an action of operation performed on a trigger position region according to a preset action of operation is detected, the new window is displayed at the preset position of the user interface. In implementations, the new window may include one or more payment application identifiers.

In implementations, to display each payment application identifier in the new window, an identifier of the new window may be inserted in a payment application corresponding to the payment application identifier. In response to detecting a preset operation on the trigger position region of the new window that is set on the user interface, a determination is made as to whether the identifier of the new window is inserted in the payment application corresponding to the payment application identifier. If affirmative, the payment application identifier is added to the new window.

S106 detects a selection of a payment application identifier in the new window.

S108 displays payment information corresponding to the selected payment application identifier onto the user interface.

In implementations, the payment information may include, but is not limited to, QR code payment information, for example.

The disclosed method detects a preset operation for a user interface, displays a new window on the user interface, with the new window including one or more payment application identifiers, selects a payment application identifier in the new window, and displays payment information corresponding to the selected payment application identifier on the user interface. Accordingly, a user does not need to find and open payment information of a corresponding application having a payment function. Even if the user is using another application, the user does not need to close the other application that is currently used. Instead, the user can directly find the payment information of the corresponding application having the payment function from the displayed new window by performing the preset operation on the desktop of a user device, thus completing the payment. Therefore, the entire payment process can greatly save time for the user or merchant. Moreover, the payment may be completed conveniently without interrupting the current operation of the user, thus greatly improving the user experience.

In implementations, a program code corresponding to a new window may be inserted into an operating system of a user device (i.e., supported by the operating system of the user device), to prevent the new window from being blocked or killed to miss notification (for example, some antivirus software may consider a program corresponding to a new window as malware, and kill the new window).

Second Embodiment

Figure 2:
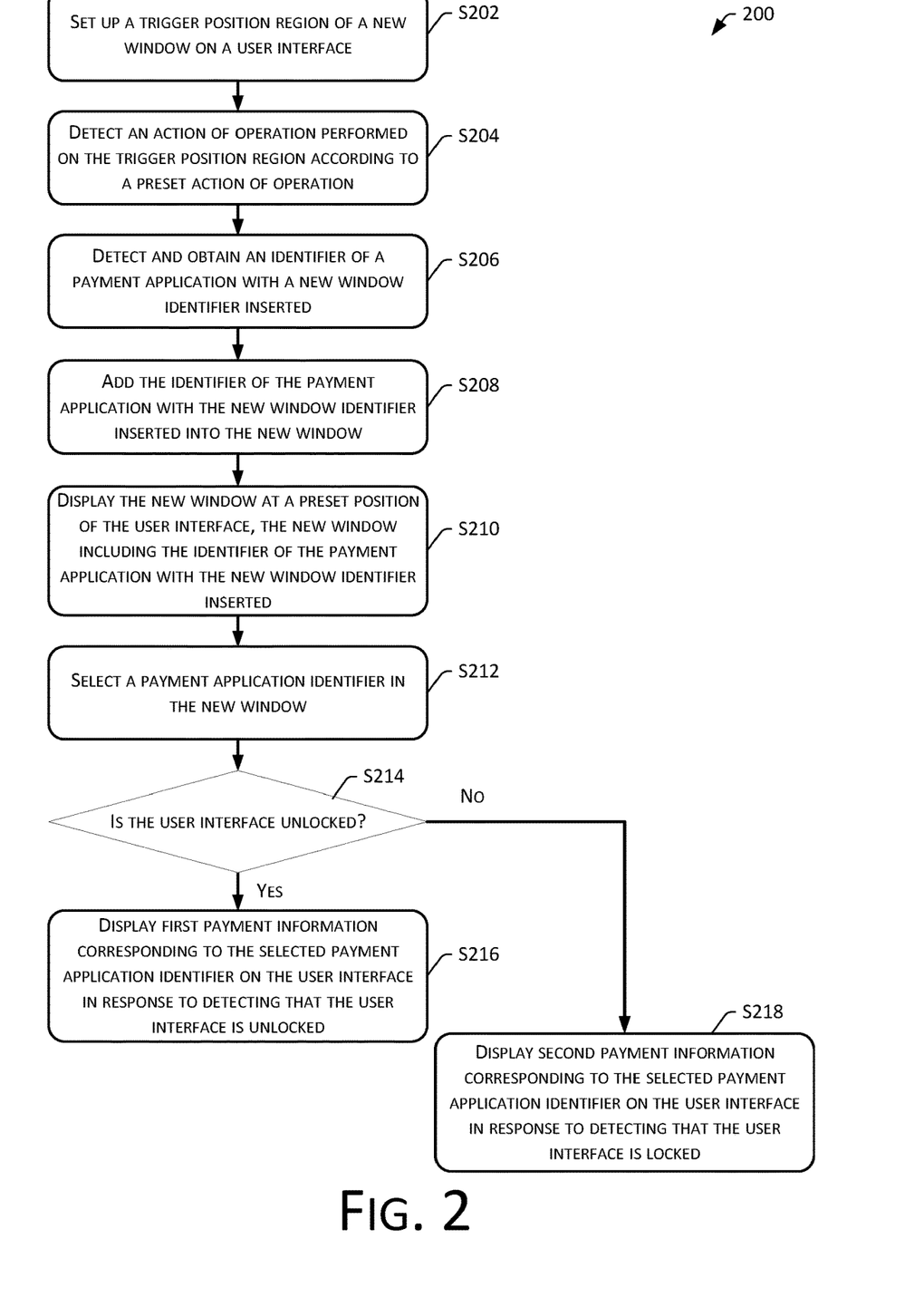
FIG. 2 is a flowchart of a payment information processing method according to an embodiment of the present disclosure.

FIG. 2 is a flowchart of a payment information processing method 200 according to an embodiment of the present disclosure. As shown in FIG. 2, the method 200 may include the following procedure.

S202 sets up a trigger position region of a new window on a user interface.

S204 detects an action of operation performed on the trigger position region according to a preset action of operation.

S206 detects and obtains an identifier of a payment application with a new window identifier inserted.

S208 adds the identifier of the payment application with the new window identifier inserted into the new window.

S210 displays the new window at a preset position of the user interface, the new window including the identifier of the payment application with the new window identifier inserted.

S212 selects a payment application identifier in the new window.

S214 detects whether the user interface is unlocked, and proceeds to execute S216 if affirmative, or proceeds to execute S218 otherwise.

S216 displays first payment information corresponding to the selected payment application identifier on the user interface in response to detecting that the user interface is unlocked.

In implementations, a pre-authorized application identifier list may further be set up to ensure payment security. In implementations, the pre-authorized application identifier list may include payment application identifiers that have been authorized through security authentication. In response to detecting that the user interface is in an unlocked state, a determination is made as to whether the selected payment application identifier exists in the pre-authorized application identifier list based on the selected payment application identifier. If affirmative, corresponding first payment information is acquired from the selected payment application, and the first payment information is displayed on the user interface. In implementations, the first payment information is valid payment information.

S218 displays second payment information corresponding to the selected payment application identifier on the user interface in response to detecting that the user interface is locked.

In implementations, the second payment information is invalid payment information. To ensure payment security, even though the selected payment application identifier exists in the pre-authorized application identifier list, corresponding first payment information (i.e., valid payment information) cannot be acquired from the selected payment application at this point because the user interface is detected as unlocked, and only the invalid payment information is displayed on the user interface.

The disclosed method detects a preset operation for a user interface, displays a new window on the user interface, selects any payment application identifier in the new window, and displays payment information corresponding to the selected payment application identifier on the user interface. Accordingly, a user does not need to find and open payment information of a corresponding application having a payment function. Even if the user is using another application, the user does not need to close the other application that is currently used. Instead, the user can directly find the payment information of the corresponding application having the payment function from the displayed new window by performing the preset operation on the desktop of a user device, thus completing the payment. Therefore, the entire payment process can greatly save time for the user or merchant. Moreover, the payment may be completed conveniently without interrupting the current operation of the user, thus greatly improving the user experience.

In implementations, the payment application may be pre-authorized and authenticated in advance to ensure payment security.

In implementations, different payment information may be displayed on a user interface according to whether the user interface is in an unlocked state, to ensure payment security. In other words, valid payment information is displayed if the user interface is unlocked, and invalid payment information is displayed when the user interface is locked.

Third Embodiment

Figure 3A:
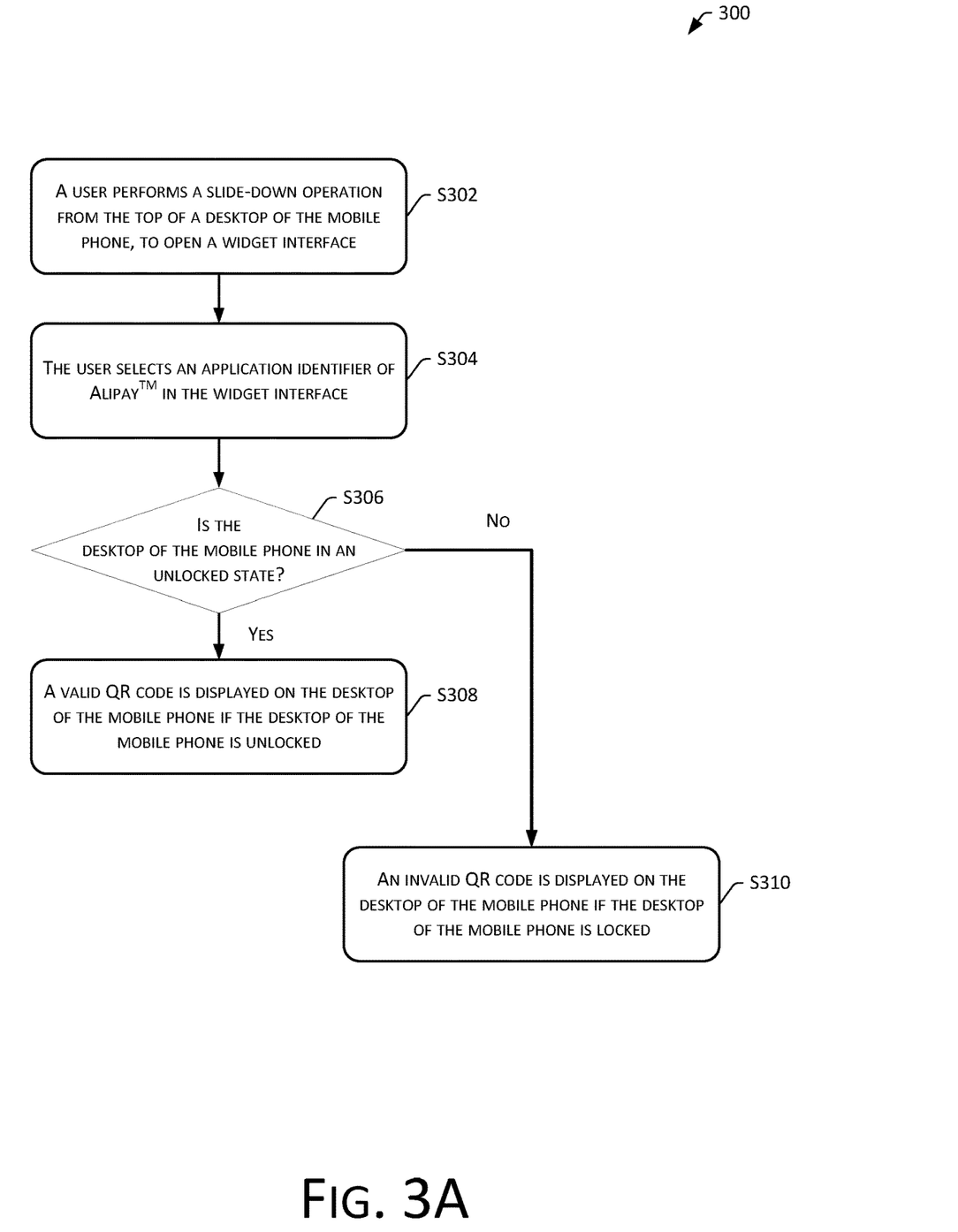
FIG. 3A is a flowchart of a payment information processing method according to an embodiment of the present disclosure.

The technical solutions of the present disclosure are described hereinafter in detail through exemplary implementations. FIG. 3A is a flowchart of a payment information processing method 300 according to an embodiment of the present disclosure. In this example embodiment, a mobile phone is used as an example. A widget interface is used as an example of the new window, and a QR code is used as an example of the payment information being for illustration. A widget corresponding to the widget interface is implanted in an operating system of a user device, to prevent the widget from being blocked to miss notification. As shown in FIG. 3A, the method 300 may include the following procedure.

At S302, a user performs a slide-down operation from the top of a desktop of the mobile phone, to open a widget interface.

At this point, the mobile phone of the user may be in a lock screen state, or may be in an unlocked state (for example, the user is watching a video, reading an online novel, or playing an online game) and the user does not want to close another application currently used. The widget interface displays an identifier of a payment application. The identifier of the payment application is displayed in the widget interface only when corresponding widget code is inserted into the payment application.

By way of example, two applications having a payment function, i.e., Alipay™ and WeChat Pay, exist in the mobile phone of the user, and corresponding widget codes are inserted in both Alipay™ and WeChat. Therefore, application identifiers of Alipay™ and WeChat may be displayed in the widget interface.

At S304, the user selects an application identifier of Alipay™ in the widget interface.

At S306, a determination is made as to whether the desktop of the mobile phone is in an unlocked state, and S308 is performed if affirmative, or S310 is performed otherwise.

In implementations, a kernel (such as darwin) of the operating system of the mobile phone may monitor whether the desktop of the mobile phone is unlocked.

At S308, a valid QR code is displayed on the desktop of the mobile phone if the desktop of the mobile phone is unlocked.

In implementations, when the kernel (such as darwin) of the operating system of the mobile phone monitors that the desktop of the mobile phone is unlocked, the kernel (such as darwin) instructs Alipay™ to send a valid QR code for payment of the user to a keychain of the operating system of the mobile phone. The keychain of the operating system of the mobile phone verifies whether the valid QR code is allowed to be sent to the widget interface and displayed on the desktop of the mobile phone according to a pre-authorized application identifier list (APP group). If the pre-authorized application identifier list (APP group) includes the application identifier of Alipay™, this indicates that Alipay™ is authorized and authenticated, and thus is safe.

At S310, an invalid QR code is displayed on the desktop of the mobile phone if the desktop of the mobile phone is locked.

Figure 3B:
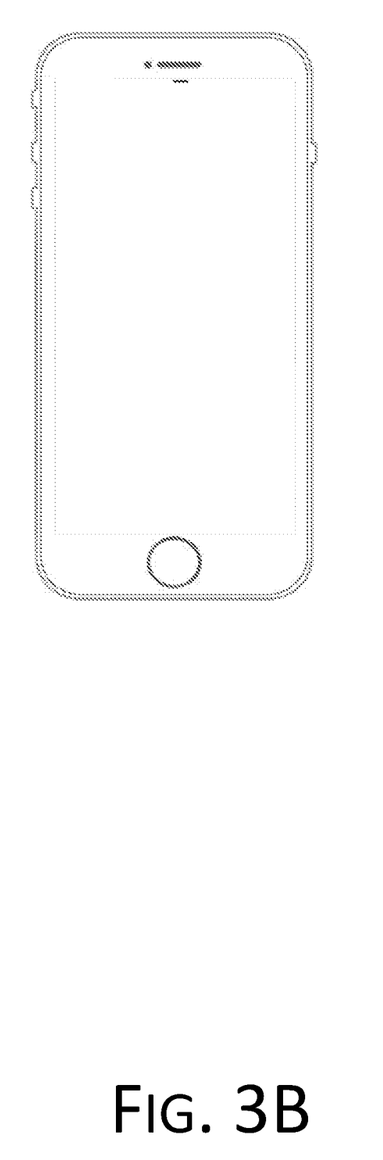
FIG. 3B is a schematic interaction diagram of an action of operation for triggering a widget interface employed in an embodiment of the present disclosure.
Figure 3C:
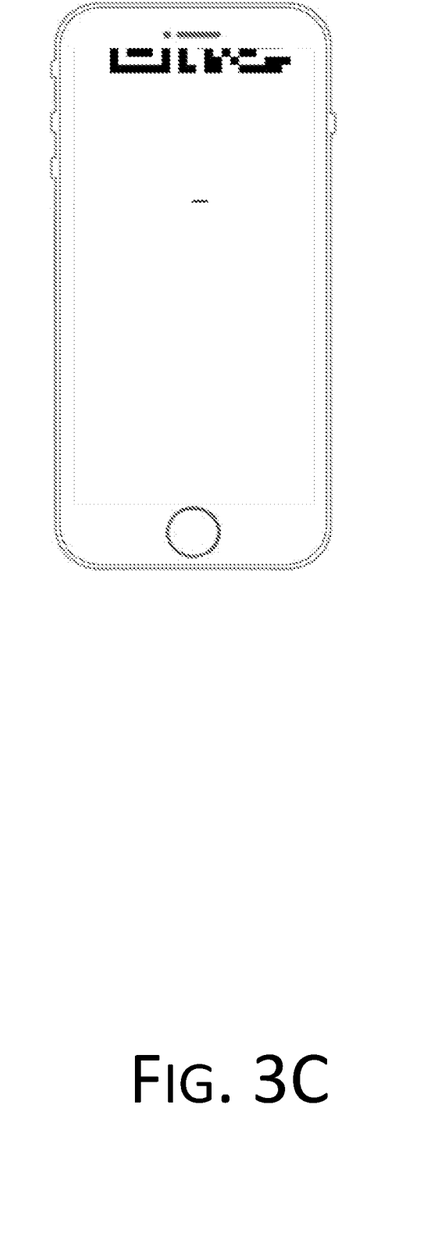
FIG. 3C is a schematic interaction diagram of an action of operation for triggering a widget interface employed in an embodiment of the present disclosure.
Figure 3D:
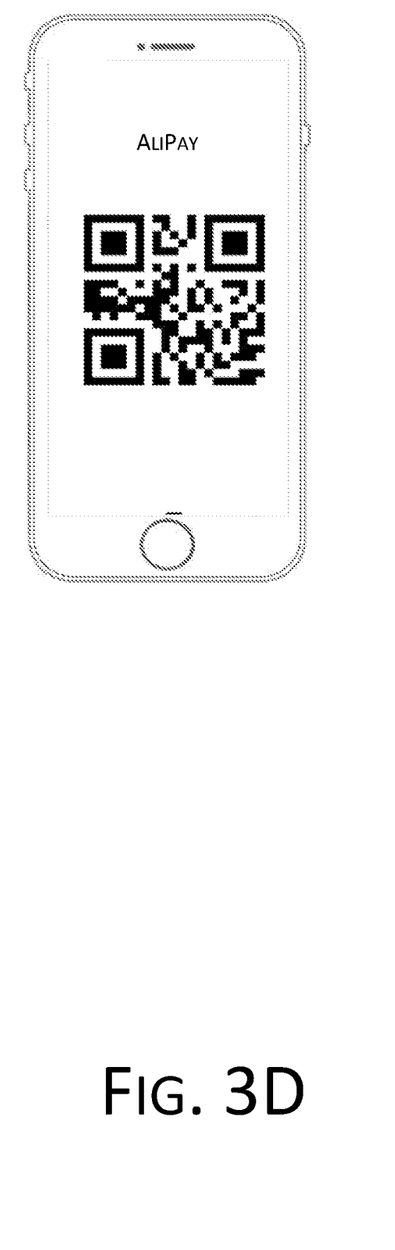
FIG. 3D is a schematic interaction diagram of an action of operation for triggering a widget interface employed in an embodiment of the present disclosure.

FIG. 3B, FIG. 3C and FIG. 3D are schematic interaction diagrams of actions of operation for triggering the widget interface employed in the embodiment of the present disclosure. As shown in FIG. 3B, a trigger position region of the widget interface exists at the top of the desktop of the mobile phone, and a widget interface is opened by performing a slide-down operation on the trigger position region at the top of the desktop of the mobile phone. FIG. 3C is an intermediate state of opening the widget interface. FIG. 3D shows a completely opened widget interface, with a QR code for payment being displayed on the widget interface.

The disclosed method does not need the user to close another application currently used, and also does not need the user to open a corresponding payment application to find a corresponding payment QR code. Instead, a widget interface displaying a payment application identifier may be opened through a slide-down operation on the desktop of the mobile phone. When the user selects a payment application from the widget interface and the desktop of the mobile phone is unlocked, a valid QR code is presented directly on the desktop of the mobile phone through the widget interface. When the desktop of the mobile phone is locked, an invalid QR code is presented on the desktop of the mobile phone through the widget interface. This greatly improves the convenience of payment, and greatly improves the user experience.

Fourth Embodiment

Figure 4:
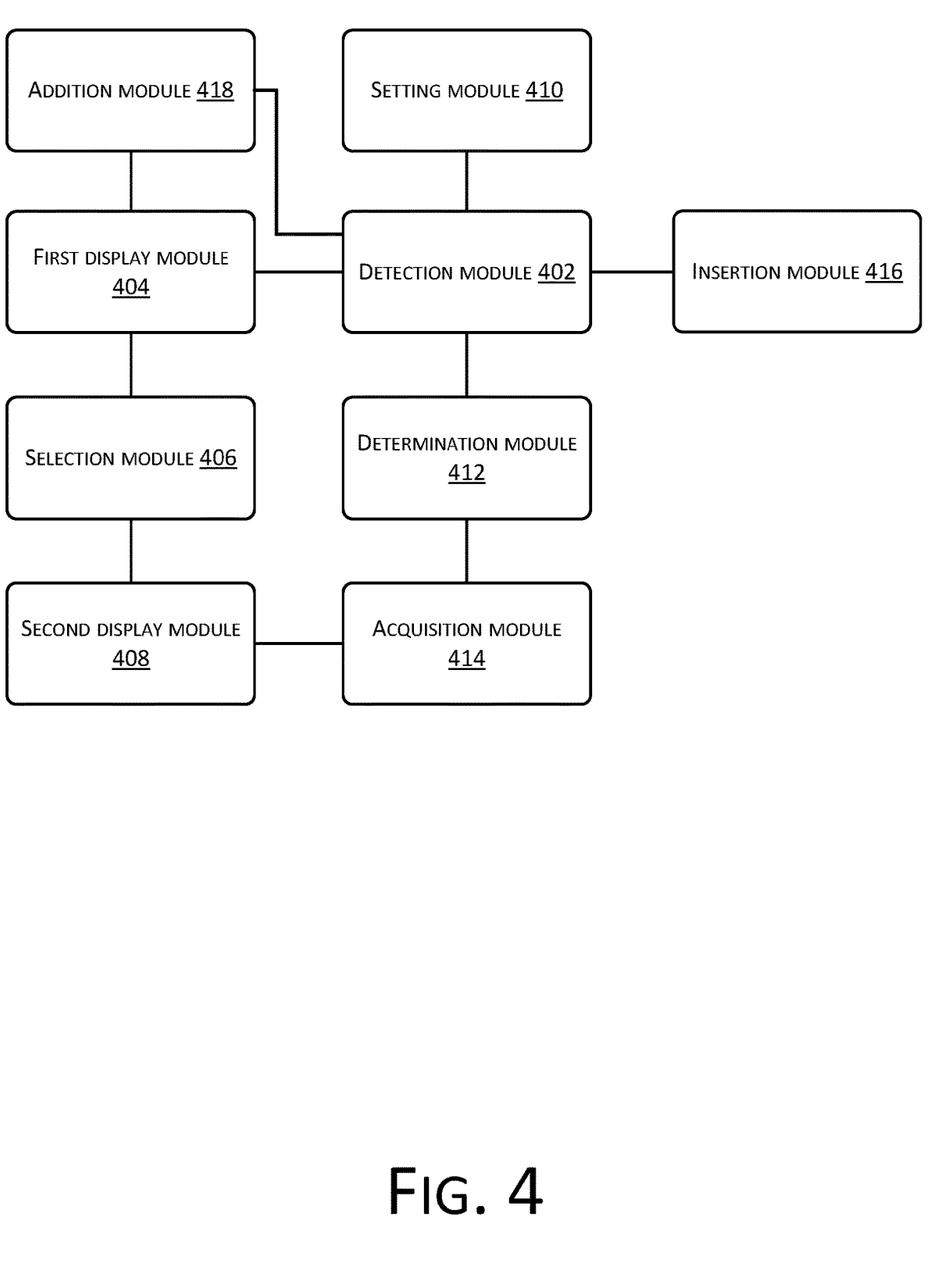
FIG. 4 is a structural diagram of a payment information processing apparatus according to an embodiment of the present disclosure.

FIG. 4 is a structural diagram of a payment information processing apparatus 400 according to an embodiment of the present disclosure. As shown in FIG. 4, the apparatus 400 may include a detection module 402 configured to detect a preset operation for a user interface; a first display module 404 configured to display a new window on the user interface, the new window including one or more payment application identifiers; a selection module 406 configured to select or receive a selection of a payment application identifier in the new window; and a second display module 408 configured to display payment information corresponding to the selected payment application identifier on the user interface.

In implementations, the apparatus 400 may further include a setting module 410 configured to set up a trigger position region of the new window on the user interface. In implementations, the detection module 402 may further detect an action of operation performed on the trigger position region according to a preset action of operation, and the first display module 404 may display the new window at a preset position of the user interface.

In implementations, the preset action of operation may include a sliding operation, a double-click operation, or a click operation.

In implementations, the detection module 402 may further detect whether the user interface is unlocked, and the second display module 408 may further display first payment information corresponding to the selected payment application identifier on the user interface in response to detecting that the user interface is in the unlocked state, or display second payment information corresponding to the selected payment application identifier on the user interface in response to detecting that the user interface is in a locked state, where the first payment information is valid payment information, and the second payment information is invalid payment information.

In implementations, the apparatus 400 may further include a determination module 412 configured to determine whether the selected payment application identifier exists in the pre-authorized application identifier list based on the selected payment application identifier in response to detecting that the user interface is in the unlocked state; and an acquisition module 414 configured to acquire the first payment information from the selected payment application in response to determining that the selected payment application identifier exists in the pre-authorized application identifier list.

In implementations, the second display module 408 may display the acquired first payment information on the user interface.

The apparatus 400 may further include an insertion module 416 configured to insert an identifier of the new window into the payment application corresponding to the payment application identifier.

In implementations, the detection module 402 may detect whether the identifier of the new window is inserted in the payment application corresponding to the payment application identifier, upon detecting a preset operation for the trigger position region of the new window set on the user interface.

In implementations, the apparatus 400 may further include an addition module 418 configured to add the payment application identifier to the new window in response to detecting that the identifier of the new window is inserted in the payment application corresponding to the payment application identifier.

The apparatus shown in FIG. 4 may perform the methods described in the embodiments as shown in FIG. 1, FIG. 2, and FIGS. 3A-D, and implementation principles and technical effects thereof are not repeatedly described herein.

The present disclosure further provides a user device, which may include the payment information processing apparatus as shown in FIG. 4, and can perform the methods described in the embodiments as shown in FIG. 1, FIG. 2, and FIGS. 3A-D, and implementation principles and technical effects thereof are not repeatedly described herein.

Fifth Embodiment

Figure 5:
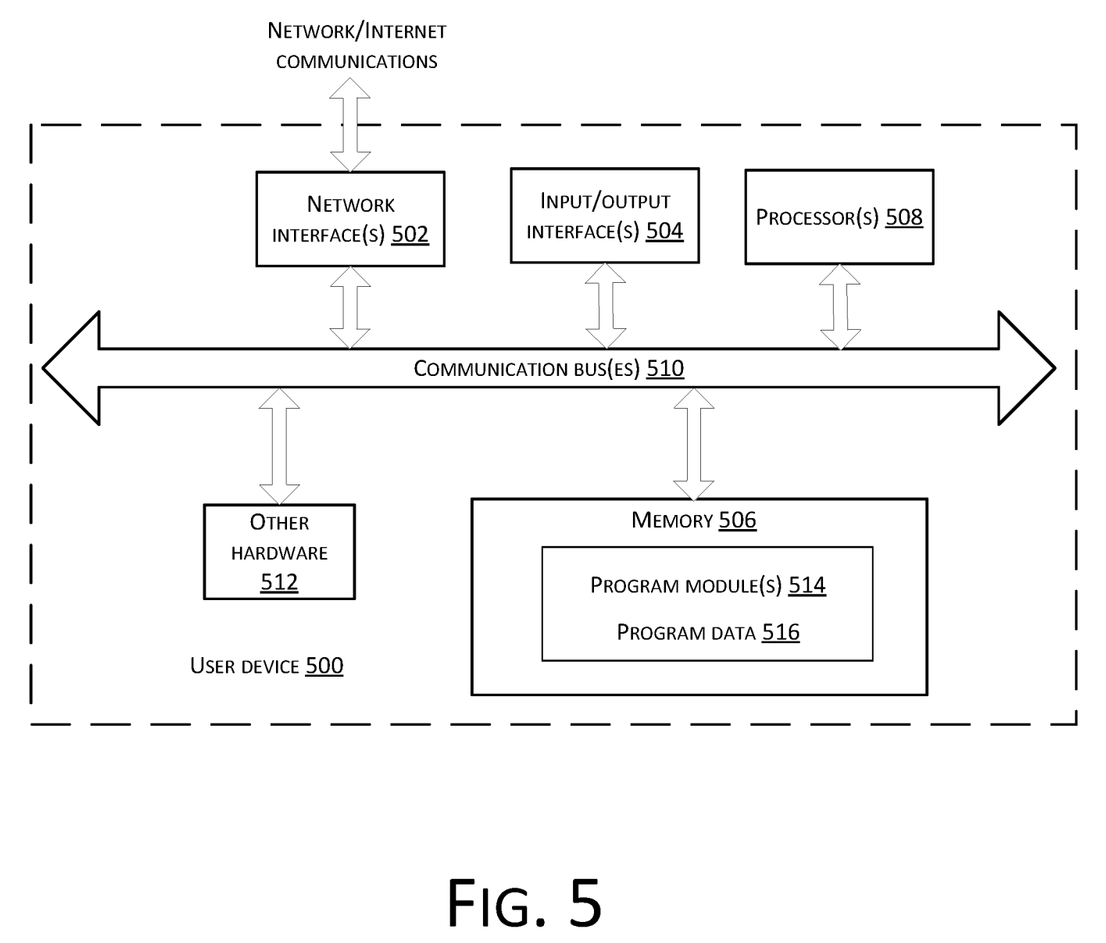
FIG. 5 is a structural diagram of a user device according to an embodiment of the present disclosure.

FIG. 5 is a structural diagram of a user device 500 according to an embodiment of the present disclosure. In implementations, the user device 500 may include a personal computer, a smart phone, a PAD (tablet computer), a two-in-one PC tablet, etc. In a typical configuration, a computing device includes one or more processors (CPUs), an input/output interface, a network interface, and memory.

By way of example and not limitation, the user device 500 may include one or more network interfaces 502 (such as a wired network interface, and/or a wireless network interface) for network/Internet communications, and one or more input/output (I/O) interfaces 504. In implementations, the user device 500 may further include memory 506, one or more processors 508, one or more communication buses 510, and other hardware 512, as shown in FIG. 5.

The memory 506 may include a form of computer-readable media, e.g., a non-permanent storage device, random-access memory (RAM) and/or a nonvolatile internal storage, such as read-only memory (ROM) or flash RAM. The memory 506 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

The memory 506 may include one or more program modules 514 and program data 516. In implementations, the one or more program modules 514 are stored in the memory 506 and are configured to be controlled and/or executable by the one or more processors 508. In implementations, the one or more program modules 514 may execute instructions to perform operations including detecting a preset operation for a user interface; displaying a new window on the user interface, the new window including one or more payment application identifiers; selecting a payment application identifier in the new window; and displaying payment information corresponding to the selected payment application identifier onto the user interface. In implementations, the one or more program modules 514 may further execute the instructions to perform setting a trigger position region of the new window on the user interface; detecting an action of operation performed on the trigger position region according to a preset action of operation; and displaying the new window at a preset position of the user interface.

In implementations, the preset action of operation may include a sliding operation, a double-click operation, or a click operation.

In implementations, the one or more program modules 514 may further execute the instructions to perform detecting whether the user interface is unlocked, and displaying first payment information corresponding to the selected payment application identifier on the user interface if affirmative, or displaying second payment information corresponding to the selected payment application identifier on the user interface otherwise, where the first payment information is valid payment information, and the second payment information is invalid payment information.

In implementations, the one or more program modules 514 may further execute the instructions to perform determining that the selected payment application identifier exists in the pre-authorized application identifier list based on the selected payment application identifier upon detecting that the user interface is in the unlocked state, and acquiring the first payment information from the selected payment application, and displaying the first payment information on the user interface.

In implementations, the one or more program modules 514 may further execute the instructions to perform inserting an identifier of the new window in the payment application corresponding to the payment application identifier.

In implementations, the one or more program modules 514 may further execute the instructions to perform detecting whether the identifier of the new window is inserted in the payment application corresponding to the payment application identifier in response to receiving a preset operation for the trigger position region of the new window set on the user interface, and adding the payment application identifier to the new window if affirmative.

It should be understood that the one or more modules as shown in FIG. 5 may further execute instructions of some or all of the example methods as shown in FIG. 1, FIG. 2, and FIGS. 3A-D.

Certain terminologies in the specification and claims are used for referring to specific components. One skilled in the art may understand that hardware manufacturers may name a same component with different names. This specification and claims do not distinguish components according to differences in names. Rather, differences in functions of the components are used as bases for distinction. For example, "include" mentioned throughout the specification and claims is an open term, and therefore should be interpreted as "include, but not limited to". "Approximately" means "within an acceptable range of error". One skilled in the art can solve the technical problem within an error range, to basically achieve the technical effect. Moreover, a term "coupling" includes any direct and indirect electrical means of coupling. Therefore, if a first apparatus is described to be coupled to a second apparatus in the text, this represents that the first apparatus may be directly electrically coupled to the second apparatus, or indirectly electrically coupled to the second apparatus through another apparatus or coupling means. Exemplary embodiments are described in the specification for implementing the present disclosure. However, such description aims at illustrating the general principles of the present disclosure, rather than limiting the scope of the present disclosure. The scope of protection of the present disclosure should be subject to the one defined by the appended claims.

It should be further noted that, the term "include", "comprise" or other variations thereof are intended to cover non-exclusive inclusion, so that a product or system including a series of elements not only includes the elements, but also includes other elements not clearly listed, or further includes inherent elements of the product or system. Without any further limitations, an element defined by "including a . . . " does not exclude other identical elements to exist in the product or system including the element.

The above description illustrates and describes a number of exemplary embodiments of the present disclosure. However, as described above, it should be understood that the present disclosure is not limited to the forms disclosed in the text, and should not be construed as exclusion to other embodiments. Rather, the present disclosure may be applicable to a variety of other combinations, modifications, and environments, and may be modified, within the scope of the inventive concepts described herein, through the above teachings or the technologies or knowledge in related art. The modifications and changes made by one skilled in the art do not apart from the spirit and scope of the present disclosure, and should all fall within the scope of protection of the appended claims.

What is claimed is:

1. A method implemented by a computing device having at least one processor, the method comprising:
   detecting, by the at least one processor, a preset operation for a user interface when an application implemented on the computing device is in use;
   determining, by the at least one processor, whether an identifier of a new window is inserted to one or more payment applications, the identifier including a program code that allows the one or more payment applications to be displayed in the new window;
   displaying, by the at least one processor, the new window on the user interface in response to the determination that the identifier of the new window is inserted to the respective one or more payment applications, the new window comprising one or more payment application identifiers corresponding to the one or more payment applications;
   receiving, by the at least one processor, a selection of a payment application identifier from the one or more payment application identifiers in the new window;
   detecting whether the user interface is unlocked;
   displaying, by the at least one processor, payment information corresponding to the selected payment application identifier on the user interface, wherein the payment information corresponding to the selected payment application identifier comprises valid payment information if the user interface is unlocked, and the payment information corresponding to the selected payment application identifier comprises invalid payment information if the user interface is not unlocked; and
   sending, by the at least one processor, the payment information to a merchant terminal to complete a transaction without interrupting the application.

2. The method of claim 1, further comprising:
   setting up a trigger position region at the user interface, on which the preset operation is detected to trigger displaying the new window;
   detecting a preset action performed on the trigger position region; and
   displaying the new window at a preset position of the user interface in response to detecting the preset action performed on the trigger position region.

3. The method of claim 2, wherein the preset action comprises at least one of a sliding operation, a double-click operation, or a click operation.

4. The method of claim 1, further comprising: in response to detecting that the user interface is unlocked,
   determining that the selected payment application identifier exists in a pre-authorized application identifier list, and
   acquiring the valid payment information from the selected payment application.

5. The method of claim 1, further comprising displaying the invalid payment information corresponding to the selected payment application identifier on the user interface in response to detecting that the user interface is not unlocked.

6. The method of claim 1, further comprising:
   detecting whether the identifier of the new window is inserted in the payment application corresponding to the payment application identifier, in response to detecting a preset action on a trigger position region of the new window configured on the user interface; and
   adding the payment application identifier to the new window in response to detecting that the identifier of the new window is inserted in the payment application corresponding to the payment application identifier.

7. A user device comprising:
   one or more processors;
   memory;
   a detection module stored in the memory and executable by the one or more processors to detect a preset operation for a user interface when an application implemented on the computing device is in use;
   a first display module stored in the memory and executable by the one or more processors to determine whether an identifier of a new window is inserted to one or more payment applications and display the new window on the user interface in response to the determination that the identifier of the new window is inserted to the one or more payment applications, the identifier including a program code that allows the one or more payment applications to be displayed in the new window and the new window comprising one or more payment application identifiers corresponding to the one or more payment applications;

a selection module configured to select a payment application identifier from the one or more payment application identifiers in the new window, wherein the detection module is further configured to detect whether the user interface is unlocked; and a second display module configured to display payment information corresponding to the selected payment application identifier on the user interface allowing the payment information to be sent to a merchant terminal for completing a transaction without interrupting the application, wherein the payment information corresponding to the selected payment application identifier comprises valid payment information if the user interface is unlocked, and the payment information corresponding to the selected payment application identifier comprises invalid payment information if the user interface is not unlocked.

8. The user device of claim 7, further comprising a setting module configured to set a trigger position region at the user interface, on which the preset operation is detected to trigger displaying the new window, wherein the detection module further detects a preset action performed on the trigger position region, and the first display module further displays the new window at a preset position of the user interface after the detection module detects the preset action performed on the trigger position region.

9. The user device of claim 7, wherein:

the second display module further displays the valid payment information corresponding to the selected payment application identifier on the user interface in response to the detection module detecting that the user interface is unlocked, or display the invalid payment information corresponding to the selected payment application identifier on the user interface in response to the detection module detecting that the user interface is locked.

10. The user device of claim 9, further comprising:

a determination module configured to determine whether the selected payment application identifier exists in a pre-authorized application identifier list in response to the detection module detecting that the user interface is unlocked; and an acquisition module configured to acquire the valid payment information from the selected payment application in response to the determination module determining that the selected payment application identifier exists in the pre-authorized application identifier list.

11. The user device of claim 7, further comprising an addition module configured to add the payment application identifier to the new window in response to the detection module detecting that the identifier of the new window is inserted in the payment application corresponding to the payment application identifier.

12. One or more computer-readable media storing executable instructions that, when executed by one or more processors, cause the one or more processors to perform acts comprising:

detecting a preset operation for a user interface when an application implemented on the computing device is in use;

determining, by the at least one processor, whether an identifier of a new window is inserted to one or more payment applications, the identifier including a program code that allows the one or more payment applications to be displayed in the new window;

displaying a new window on the user interface, the new window on the user interface in response to the determination that the identifier of the new window is inserted to the one or more payment applications, the new window comprising one or more payment application identifiers corresponding to the one or more payment applications;

receiving a selection of a payment application identifier from the one or more payment application identifiers in the new window;

detecting whether the user interface is unlocked;

displaying payment information corresponding to the selected payment application identifier on the user interface, wherein the payment information corresponding to the selected payment application identifier comprises valid payment information if the user interface is unlocked, and the payment information corresponding to the selected payment application identifier comprises invalid payment information if the user interface is not unlocked; and sending, by the at least one processor, the payment information to a merchant terminal to complete a transaction without interrupting the application.

13. The one or more computer-readable media of claim 12, the acts further comprising:

setting up a trigger position region at the user interface, on which the preset operation is detected to trigger displaying the new window;

detecting a preset action performed on the trigger position region; and displaying the new window at a preset position of the user interface in response to detecting the preset action performed on the trigger position region.

14. The one or more computer-readable media of claim 12, the acts further comprising: in response to detecting that the user interface is unlocked, determining that the selected payment application identifier exists in a pre-authorized application identifier list, and acquiring the valid payment information from the selected payment application.

15. The one or more computer-readable media of claim 12, the acts further comprising displaying the invalid payment information corresponding to the selected payment application identifier on the user interface in response to detecting that the user interface is not unlocked.

16. The one or more computer-readable media of claim 12, the acts further comprising:

detecting whether the identifier of the new window is inserted in the payment application corresponding to the payment application identifier, in response to detecting a preset action on a trigger position region of the new window configured on the user interface; and adding the payment application identifier to the new window in response to detecting that the identifier of the new window is inserted in the payment application corresponding to the payment application identifier.

* * * * *